US007469867B2

(12) United States Patent
Batten

(10) Patent No.: US 7,469,867 B2
(45) Date of Patent: Dec. 30, 2008

(54) WALL-MOUNTABLE SUPPORT BRACKET FOR A COMPONENT UNIT OF A BASE STATION FOR WIRELESS TELECOMMUNICATIONS, AND METHOD OF HOISTING THE COMPONENT UNIT

(75) Inventor: Mark Vivian Batten, Newbury (GB)

(73) Assignee: Alcatel-Lucent USA Inc, Murray Hill, NJ (US)

(*) Notice: Subject to any disclaimer, the term of this patent is extended or adjusted under 35 U.S.C. 154(b) by 11 days.

(21) Appl. No.: 11/445,861

(22) Filed: Jun. 2, 2006

(65) Prior Publication Data

US 2007/0278367 A1 Dec. 6, 2007

(51) Int. Cl.
*F16M 11/00* (2006.01)

(52) U.S. Cl. ...................................................... 248/200

(58) Field of Classification Search ................. 248/200, 248/223.31, 301, 304, 305, 332, 475.1, 339, 248/475
See application file for complete search history.

(56) References Cited

U.S. PATENT DOCUMENTS

| | | | | |
|---|---|---|---|---|
| 3,565,379 | A * | 2/1971 | Messier et al. | 248/220.42 |
| 3,923,278 | A * | 12/1975 | Marcil | 248/301 |
| 3,941,343 | A * | 3/1976 | Kennedy | 248/220.31 |
| 5,310,152 | A * | 5/1994 | O'Neill | 248/329 |
| 7,201,355 | B1 * | 4/2007 | Zien et al. | 248/301 |
| 2003/0116685 | A1 * | 6/2003 | Jensen | 248/200 |

FOREIGN PATENT DOCUMENTS

DE 3104814 * 10/1981

* cited by examiner

*Primary Examiner*—Ramon O Ramirez

(57) ABSTRACT

An example of the present invention is a wall-mountable support bracket. The support bracket is configured to support a component unit of a base station for wireless telecommunications in use. The support bracket is also configured to removably engage with and support a hanger for a winch or pulley, so as to enable the component unit to be hoisted into position.

3 Claims, 4 Drawing Sheets

WALL-MOUNTABLE SUPPORT BRACKET FOR A COMPONENT UNIT OF A BASE STATION FOR WIRELESS TELECOMMUNICATIONS, AND METHOD OF HOISTING THE COMPONENT UNIT

FIELD OF THE INVENTION

The present invention relates to telecommunications, in particular to wireless telecommunications.

DESCRIPTION OF THE RELATED ART

Component units of base stations for wireless telecommunications are relatively heavy. Typically, a component unit, such as an antenna assembly, a radio unit, a baseband unit or a digital unit, can weigh twenty kilograms or more. In consequence, a person who lifts the component unit by hand onto a support bracket risks physical injury. The support bracket might be wall-mounted, but could instead be mounted on the roof of a building, or on a mast, pole or support tower, for example. Any such mounting of the support bracket up high increases the risk of injury to that person.

It has been known to lift component units for fixing on such support brackets by using cranes and pulley systems. These are typically complex constructions that are laborious and unwieldy to use.

SUMMARY OF THE INVENTION

The inventor found a means to raise a component unit of a base station to the wall-mountable support bracket.

One example of the present invention is a wall-mountable support bracket configured to support a component unit of a base station for wireless telecommunications in use. The support bracket is also configured to removably engage with, and support, a hanger for a winch or pulley, so as to enable the component unit to be hoisted towards the support bracket.

BRIEF DESCRIPTION OF THE DRAWINGS

An embodiment of the present invention will now be described by way of Example and with reference to the drawings, in which.

The drawings are not to scale but are schematic representations.

DETAILED DESCRIPTION

Firstly, the wall-mountable support bracket will be described. Then the removable winch hanger that can be used together with the support bracket will be described. It will then be explained how the two are assembled together for use in lifting a component unit of a base station, for example an antenna assembly, into a position to be mounted on the support bracket.

Wall-Mountable Support Bracket

Figure 1:
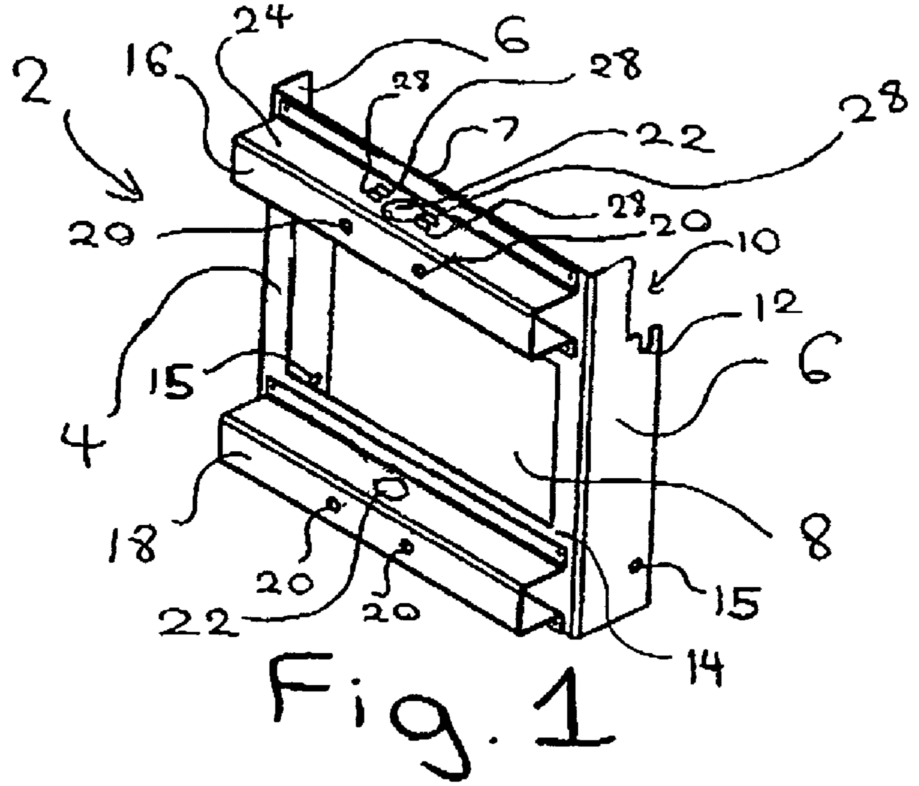
FIG. 1 is a rear perspective view of the support bracket according to the first embodiment of the present invention.
Figure 2:
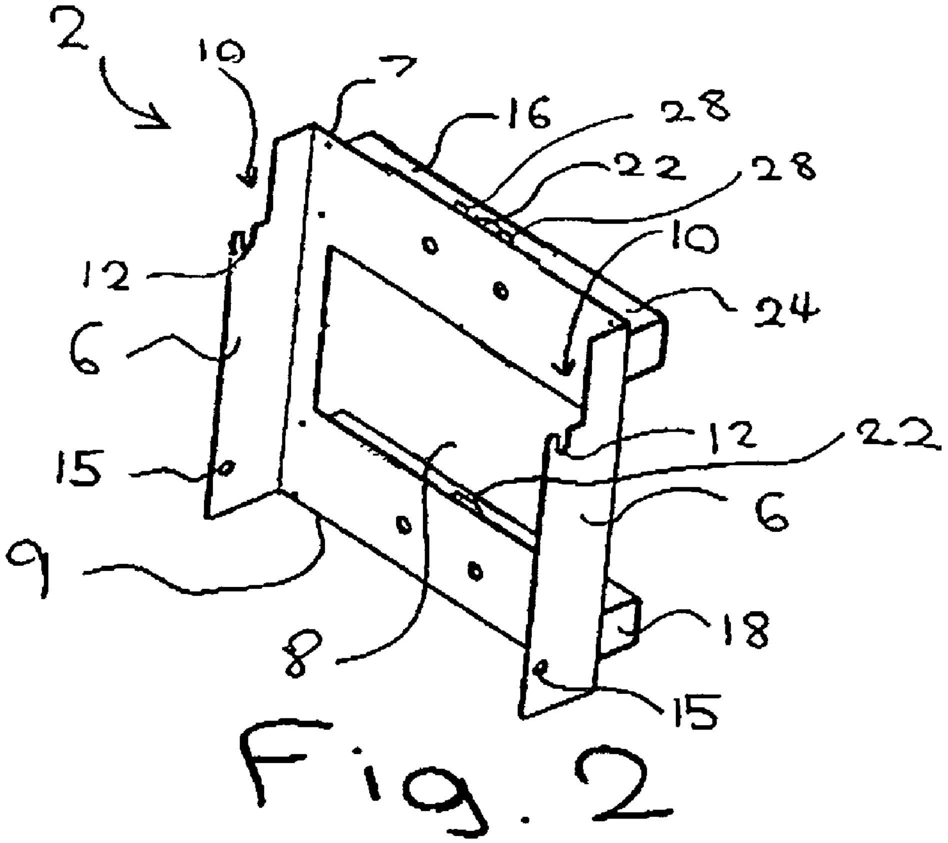
FIG. 2 is a front perspective view of the support bracket shown in FIG. 1.

As shown in FIGS. 1 and 2, the wall-mountable support bracket 2 includes a back plate 4 and two bent-up side plates 6, constructed from a single sheet of metal.

The back plate 4 has a centrally located rectangular aperture 8 to reduce weight and materials. It includes an upper edge 7 and a lower edge 9.

Each side plate 6 is cut to include a cut-away portion 10 including a notch 12. Each notch 12 is downwardly directed, and shaped for cooperative engagement with a corresponding bolt (not shown in FIGS. 1 and 2). Each side plate 6 also includes a hole 15 that is shaped to receive a corresponding bolt (not shown). Each of the holes 15 is located away from the notch 12.

On the back face 14 of the back plate 4 two parallel box-section supports 16, 18 are mounted. The first box-section support 16 is located near the upper edge 7 and runs parallel to that upper edge 7. The second box-section support 18 is located near the lower edge 9 and runs parallel to that lower edge 9. The box-section supports 16,18 are welded to the back face 14 of the back plate 4. The box-section supports 16,18 each include small holes 20 for fastening the support bracket 2 securely to a wall (not shown in FIGS. 1 and 2) using conventional fixings such as screws (not shown). By the use of conventional fixings (not shown), such as bolts or screws, through the holes 20, the support bracket can alternatively be fixed to a mast (not shown) or pole (not shown).

Each box-section support 16,18 includes larger circular holes 22 in top and bottom surfaces. The centres of each of these four holes lie along an axis.

On the top surface 24 of the upper box-section support 16 are locating nibs 28 which will be described further below.

Winch Hanger

Figure 3:
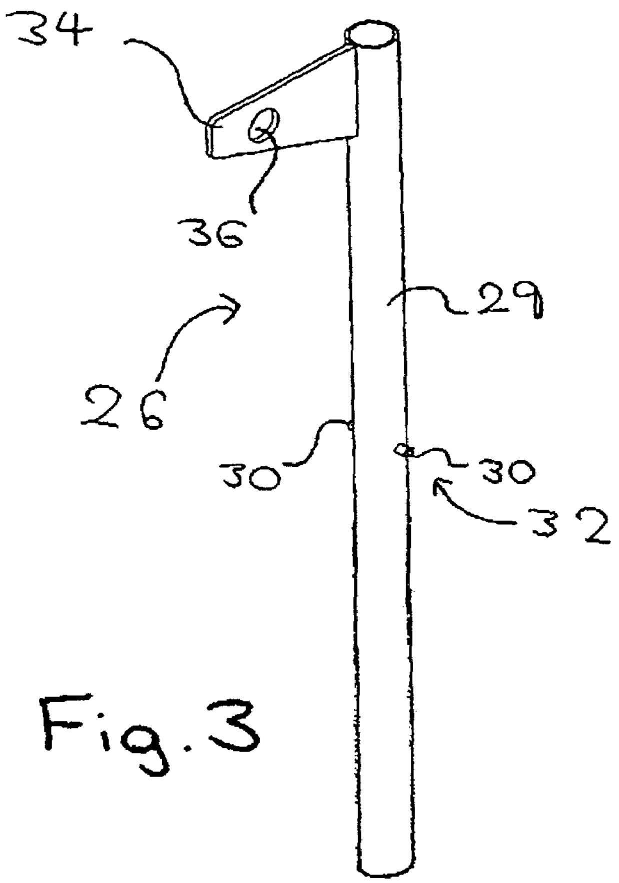
FIG. 3 is a perspective view of a winch hanger according to the first Embodiment of the invention.

As shown in FIG. 3, a winch hanger 26 consists of a tubular rod body 29 having two locating pins 30 extending outwards in opposite directions from the longitudinally central portion 32 of the body. To one end of the body 29 is fixed an armature 34 including an aperture 36 through which a winch (not shown in FIG. 3) can be hooked.

The winch hanger 26 can be removably engaged with the support bracket 2, to form an assembly, as described in more detail below.

Assembly

Figure 4:
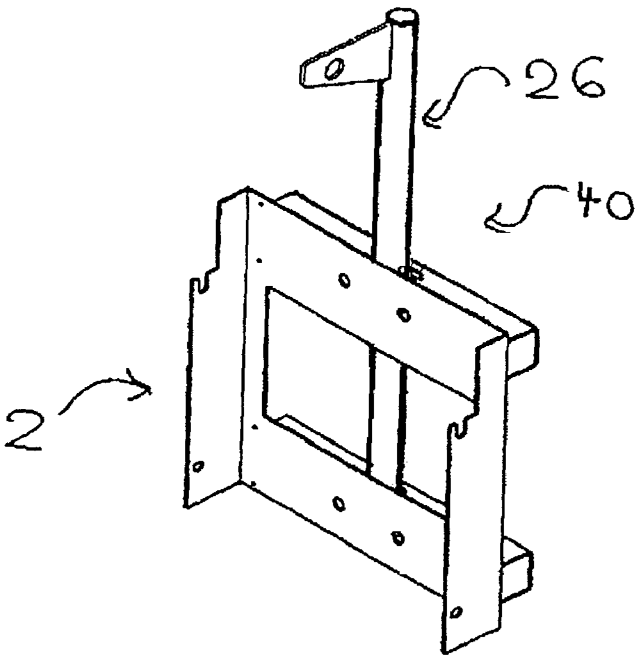
FIG. 4 is a front perspective view of the assembly of the support bracket shown in FIGS. 1 and 2, together with the winch hanger shown in FIG. 3.

The assembly 40 of the support bracket 2 and winch hanger 26 is shown in FIG. 4. To assemble the assembly 40, the body 29 is inserted through the top and bottom holes 22 of the upper box-section support 16 and then through the top and bottom holes 22 of the lower box-section support 18 until the locating pins 30 of the winch hanger 26 engage with the locating nibs 28 of the support bracket 2. Each pin 30 is then cradled between two corresponding nibs and supported by the upper surface 24 of the upper box-section support 16.

In position relative to the support bracket 2, as shown in FIG. 4, the winch hanger 26 is supported longitudinally by the abutment of its pins 30 to the upper surface 24 of the upper box-section support 16. The winch hanger 26 is supported rotationally along its central longitudinal axis by the nibs 28 cooperatively engaging with the pins 30. Furthermore, the winch hanger 26 is supported transversely by the contact between the edges of holes 22 and the outer surface of the rod body 29.

Component Unit of a Base Station

Figure 6:
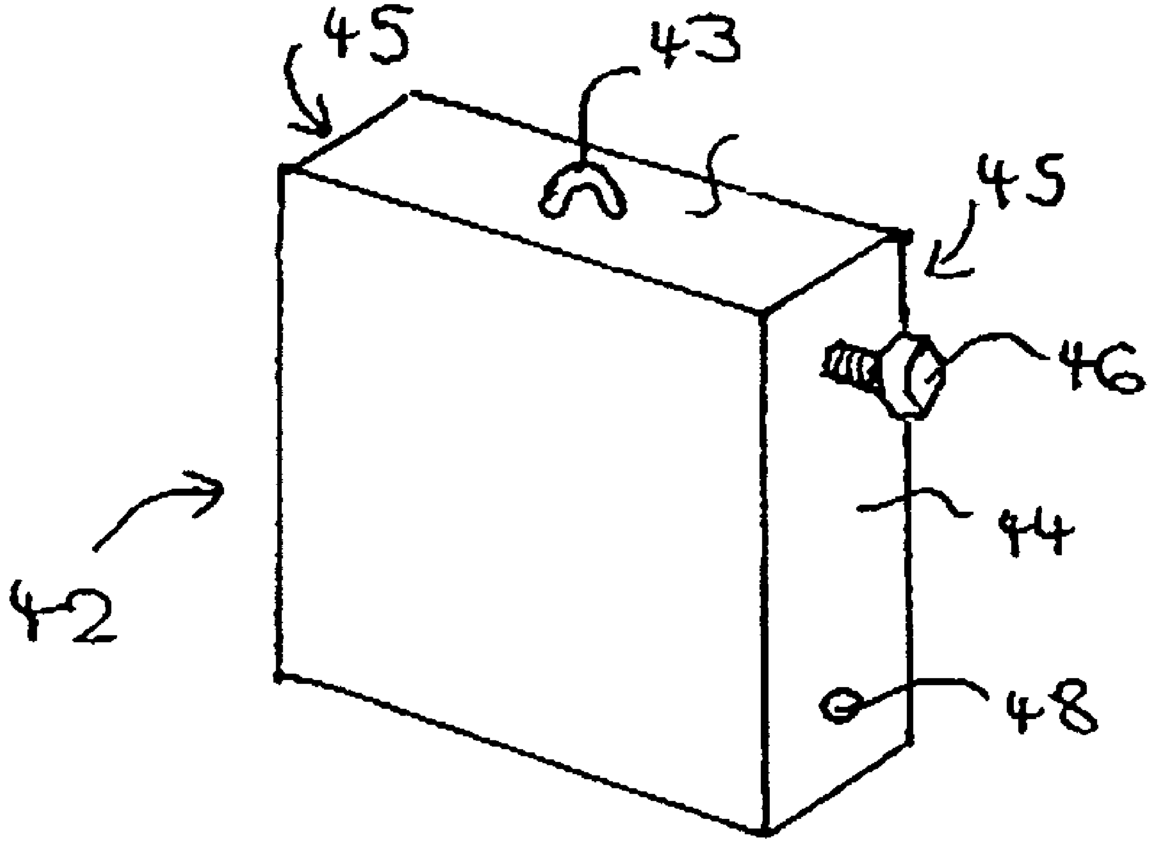
FIG. 6 is a perspective view of the base station component unit to be mounted.

As shown in FIG. 6, the base station component unit to be mounted, which in this example is an antenna assembly 42, includes a fastening 43 on its top surface 47 to which a chain (not shown) can be attached. From each of the opposite side faces 44 of the antenna assembly 42, a bolt 46 extends. Each side 45 of the antenna assembly 42 also includes a threaded bore 48 below its bolt 46.

Use

Figure 5:
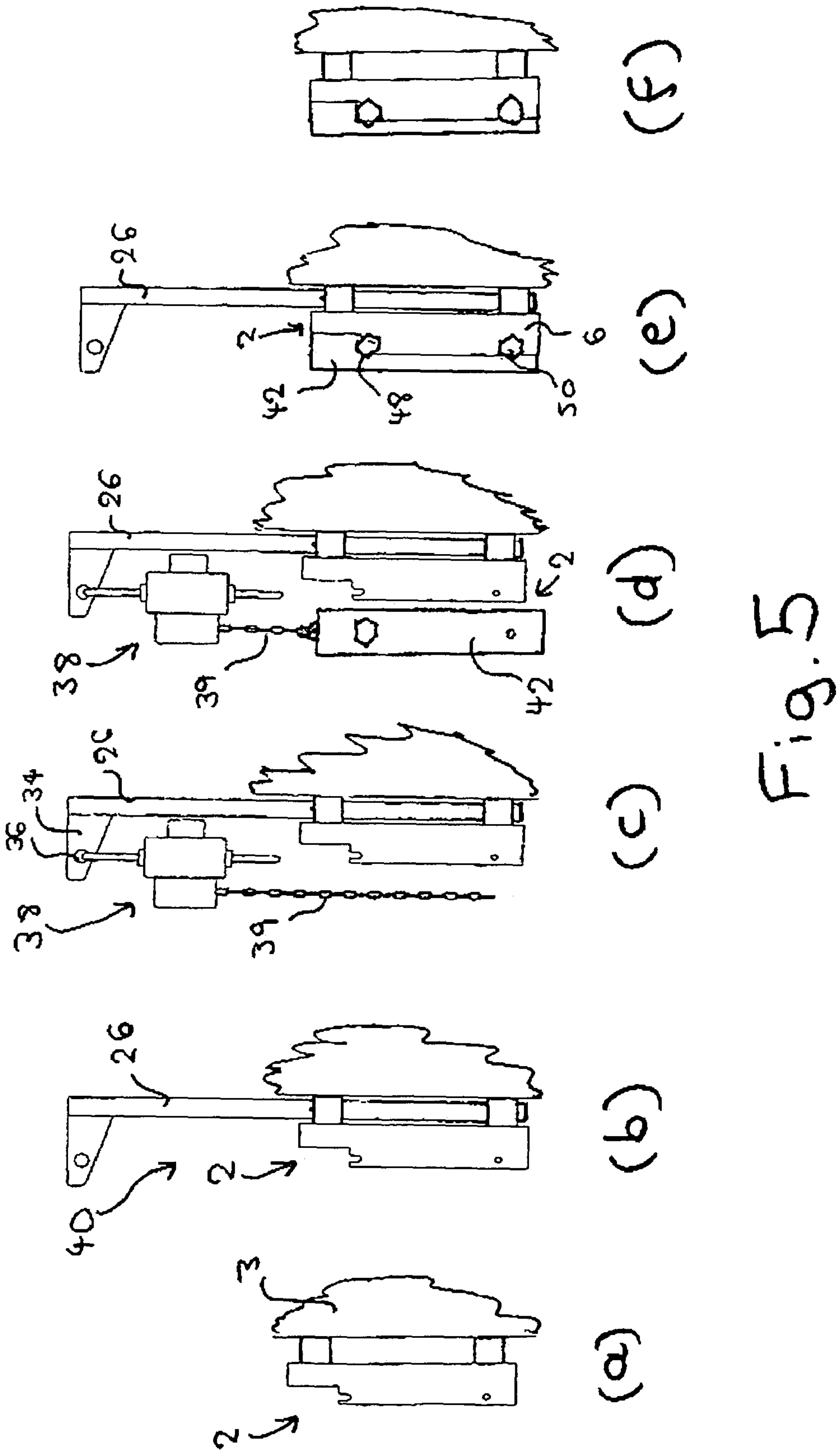
FIG. 5 is a diagram, showing as a sequence of side views, different stages in the use of the support bracket and winch support.

The use of the winch hanger 26 in relation to the support bracket 2 is show in FIG. 5, which consists of a sequence of side views:

Firstly, as shown in FIG. 5(*a*), the support bracket 2 is fixed to a wall 3.

As shown in FIG. 5(*b*), the winch hanger 26 is then cooperatively engaged with the support bracket 2 as described above so as to form the assembly 40.

As shown in FIG. 5(*c*), a winch 38 is then hooked through the aperture 36 in the armature 34 of the winch hanger 26 so as to hang from the winch hanger 26. The winch 38 includes a winch chain 39.

As shown in FIG. 5(*d*), the antenna assembly 42 is then suspended from the winch chain 39 of the winch 38. The antenna assembly 42 is lifted using the winch 38 to a position adjacent the support bracket 2.

As shown in FIG. 5(*e*), the antenna assembly 42 is then fixed to the support bracket 2. Specifically, the antenna assembly 42 is lowered into a position whereby each of the two bolts 46 cooperatively engages with the corresponding notch 12 on the side plates 6 of the support bracket 2 so as to provide support for the antenna assembly 42. The bolts 46 are then fully tightened so as to secure the antenna assembly 42 in position. To further secure the antenna assembly 42 in position on the support bracket, bolts 50 are screwed through the holes 15 in each side plate 6 of the support bracket 2 into each of the threaded bores 48 on the sides of the antenna assembly 42. The winch chain is then disengaged from the antenna assembly 42. The winch including the winch chain is then unhooked and removed.

As shown in FIG. 5(*f*), the winch hanger is then removed.

In consequence of the above steps, the antenna assembly 42 becomes securely fastened to the wall-mounted support bracket 2 in a simple, effective and safe way.

General

The present invention may be embodied in other specific forms without departing from its spirit or essential characteristics. In particular, although some example embodiments refer to winches and winching, other methods of hoisting can be used, such as by the use of pulleys. Other examples of the component unit, besides an antenna assembly, are a radio unit, a baseband unit or a digital unit. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. An assembly comprising a wall-mountable support bracket, a hanger, and a winch or pulley;

the wall-mountable support bracket comprising a component unit support, the component unit support being configured to support a component unit of a base station for wireless telecommunications in use, wherein the support bracket also comprises a hanger support, the hanger support removably engaging with and supporting the hanger, the hanger removably engaging, with and supporting the winch or pulley so as to enable the component unit to be hoisted towards the support bracket;

wherein the hanger has a substantially tubular or cylindrical body, and the hanger support of the support bracket has corresponding apertures to receive and support that tubular or cylindrical body;

wherein the body of the hanger includes at least one outwardly directed pin configured to be supported by corresponding portions of the hanger support of the support bracket that engage with said at least one pin so as to support the hanger in use.

2. An assembly according to claim 1, wherein the corresponding portions cradle said at least one pin and comprise at least one pair of locating nibs.

3. An assembly according to claim 1, wherein the hanger is a winch hanger.

* * * * *